United States Patent
Tohta et al.

(10) Patent No.: US 9,050,964 B2
(45) Date of Patent: Jun. 9, 2015

(54) VEHICLE DRIVING DEVICE AND VEHICLE DRIVING METHOD

(75) Inventors: Yuzuru Tohta, Sagamihara (JP); Masahiro Iriyama, Yokohama (JP); Yasuki Fukumoto, Isehara (JP); Morimasa Yamawaki, Tokyo (JP); Tatsuya Hayashi, Tokyo (JP)

(73) Assignees: NISSAN MOTOR CO., LTD., Yokohama-shi (JP); JATCO LTD, Fuji-shi (JP)

( * ) Notice: Subject to any disclaimer, the term of this patent is extended or adjusted under 35 U.S.C. 154(b) by 0 days.

(21) Appl. No.: 14/126,232

(22) PCT Filed: Mar. 6, 2012

(86) PCT No.: PCT/JP2012/055692
§ 371 (c)(1),
(2), (4) Date: Dec. 13, 2013

(87) PCT Pub. No.: WO2012/172840
PCT Pub. Date: Dec. 20, 2012

(65) Prior Publication Data
US 2014/0129103 A1    May 8, 2014

(30) Foreign Application Priority Data
Jun. 15, 2011  (JP) .................. P2011-133649

(51) Int. Cl.
*B60W 10/02* (2006.01)
*B60W 10/06* (2006.01)
(Continued)

(52) U.S. Cl.
CPC ........... *B60W 10/023* (2013.01); *F02D 41/022* (2013.01); *F02D 41/045* (2013.01);
(Continued)

(58) Field of Classification Search
USPC .......................................... 701/67
See application file for complete search history.

(56) References Cited

U.S. PATENT DOCUMENTS

| | | | |
|---|---|---|---|
| 6,345,223 B1* | 2/2002 | Takizawa et al. | 701/53 |
| 2002/0091477 A1* | 7/2002 | Hagiwara et al. | 701/67 |

(Continued)

FOREIGN PATENT DOCUMENTS

| | | |
|---|---|---|
| JP | 8-42684 A | 2/1996 |
| JP | 8-177996 A | 7/1996 |

(Continued)

OTHER PUBLICATIONS

Machine Translation JP 2003041959 published Feb. 13, 2003.*

(Continued)

*Primary Examiner* — Mary Cheung
*Assistant Examiner* — Anne Mazzara
(74) *Attorney, Agent, or Firm* — Foley & Lardner LLP

(57) ABSTRACT

An output power of the internal combustion engine (1) is transmitted to a drive wheel via a torque converter (2B) having a pump impeller and a turbine runner. A lockup clutch (2C) directly connects the pump impeller and the turbine runner during a coast running of a vehicle. When the accelerator pedal is slightly depressed during a coast running of a vehicle in a fuel cut-off state, the lockup clutch (2C) disengages. In addition, fuel recovery of the internal combustion engine (1) is suppressed until the engaging pressure of the lockup clutch (2C) decreases, thereby preventing a vehicle speed change caused by an output power increase of the internal combustion engine (1) before the lockup clutch (2C) substantially disengages.

12 Claims, 12 Drawing Sheets

(51) Int. Cl.
  *F02D 41/02* (2006.01)
  *F02D 41/12* (2006.01)
  *F02D 29/02* (2006.01)
  *F16H 61/14* (2006.01)
  *B60W 50/10* (2012.01)
  *B60W 30/18* (2012.01)
  *F02D 41/04* (2006.01)
  *F02D 41/30* (2006.01)
  *F16H 59/18* (2006.01)
  *B60W 30/20* (2006.01)

(52) U.S. Cl.
  CPC ............ *F02D41/126* (2013.01); *F02D 41/307* (2013.01); *F02D 29/02* (2013.01); *F02D 2200/602* (2013.01); *F02D 2400/12* (2013.01); *F16H 59/18* (2013.01); *F16H 61/143* (2013.01); *B60W 50/10* (2013.01); *B60W 10/026* (2013.01); *B60W 10/06* (2013.01); *B60W 30/18072* (2013.01); *B60W 30/20* (2013.01); *B60W 2540/103* (2013.01); *B60W 2710/021* (2013.01); *B60W 2710/0627* (2013.01)

(56) References Cited

U.S. PATENT DOCUMENTS

2007/0101972 A1   5/2007  Majima
2010/0076667 A1*  3/2010  Oshima et al. ................ 701/103

FOREIGN PATENT DOCUMENTS

| JP | 9-068084 A | | 3/1997 | |
| JP | 2003041959 A | * | 2/2003 | ............. F02D 17/02 |
| JP | 2005-172078 A | | 6/2005 | |
| JP | 2006-015819 A | | 1/2006 | |
| JP | 2007-127080 A | | 5/2007 | |
| JP | 2007-255629 A | | 10/2007 | |
| JP | 2009-150513 A | | 7/2009 | |

OTHER PUBLICATIONS

Japanese Office Action, Oct. 21, 2014, 2 pages.
Japanese Office Action, Feb. 3, 2015, 3 pages.

* cited by examiner

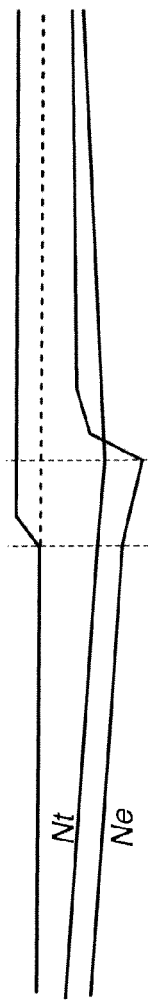
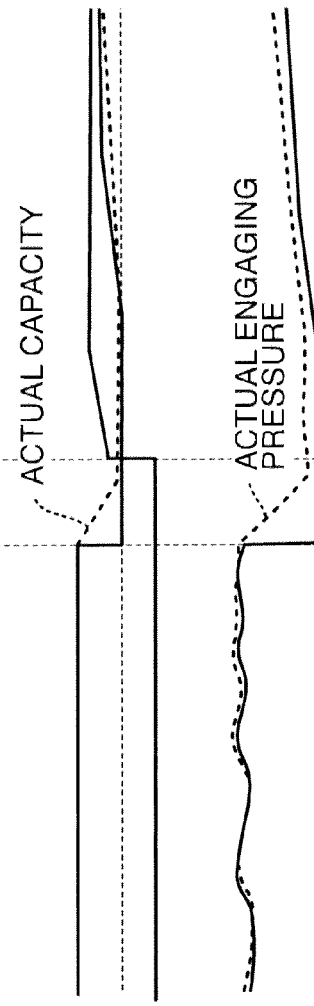
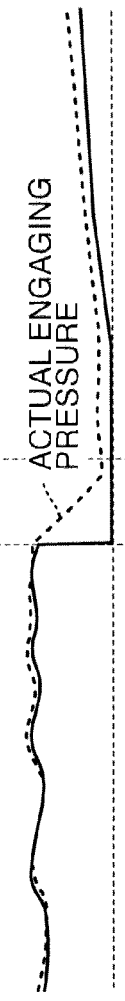
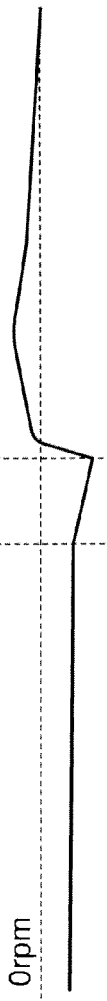
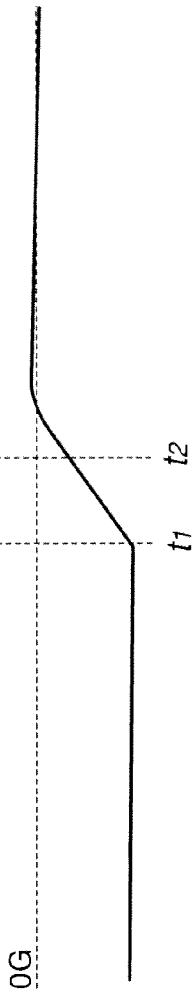
FIG. 3A ACCELERATOR OPENING
FIG. 3B TURBINE RUNNER ROTATION SPEED / ENGINE ROTATION SPEED
FIG. 3C LOCKUP CLUTCH CAPACITY / ENGINE TORQUE
FIG. 3D LOCKUP CLUTCH ENGAGING PRESSURE COMMAND VALUE
FIG. 3E SLIP ROTATION SPEED
FIG. 3F FORWARD/BACKWARD ACCELERATION

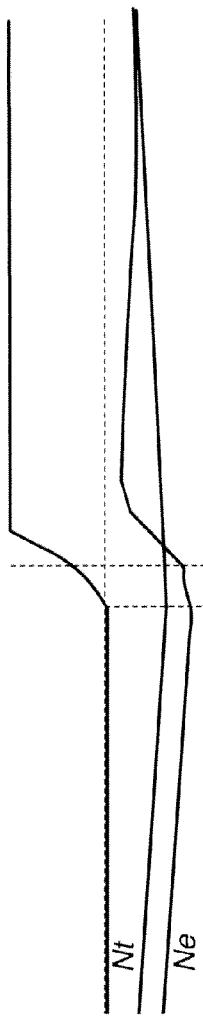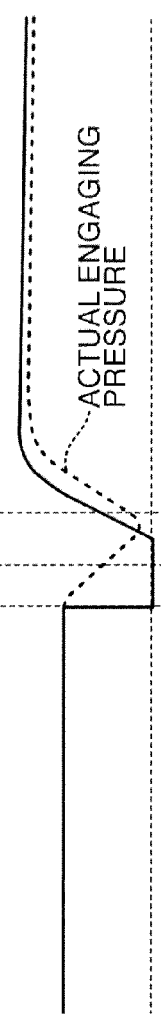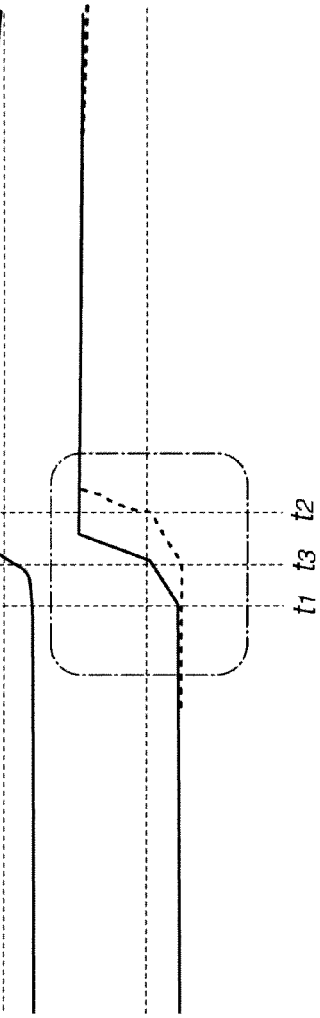
FIG. 4A ACCELERATOR OPENING
FIG. 4B TURBINE RUNNER ROTATION SPEED / ENGINE ROTATION SPEED
FIG. 4C LOCKUP CLUTCH CAPACITY / ENGINE TORQUE
FIG. 4D LOCKUP CLUTCH ENGAGING PRESSURE COMMAND VALUE
FIG. 4E SLIP ROTATION SPEED
FIG. 4F FORWARD/BACKWARD ACCELERATION

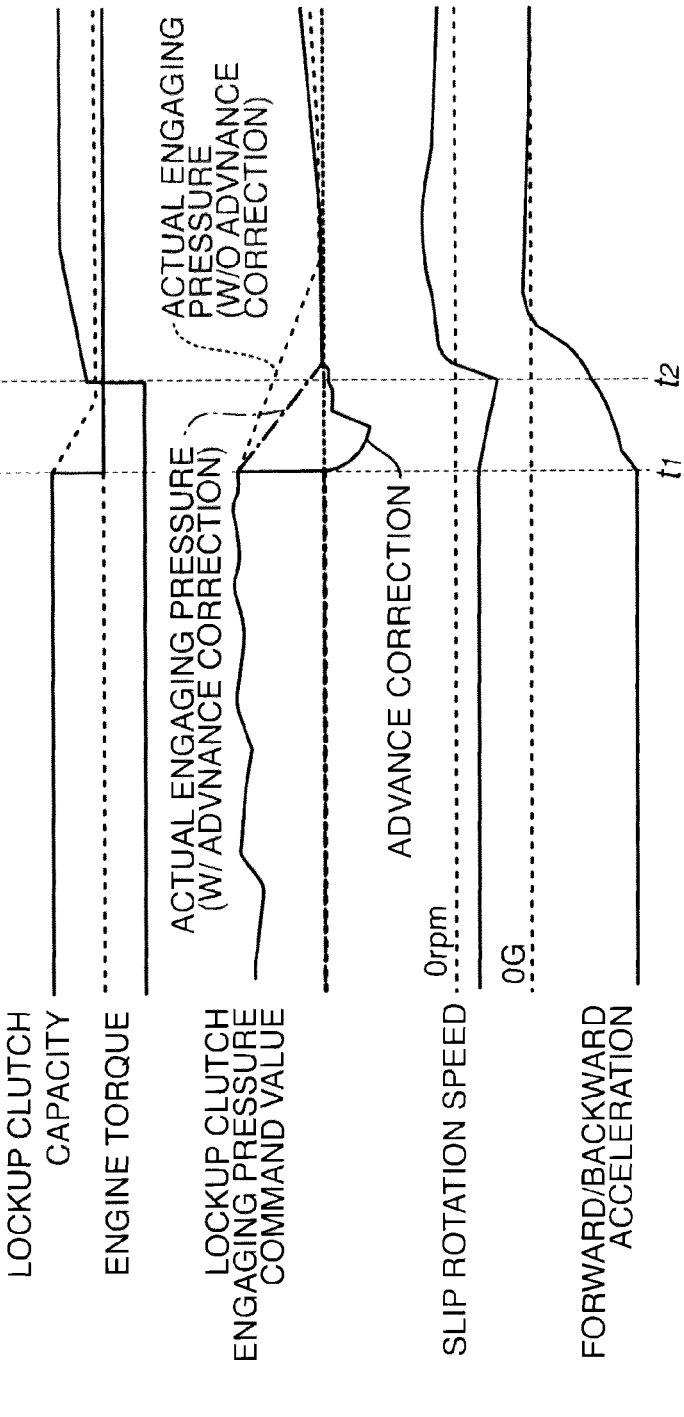

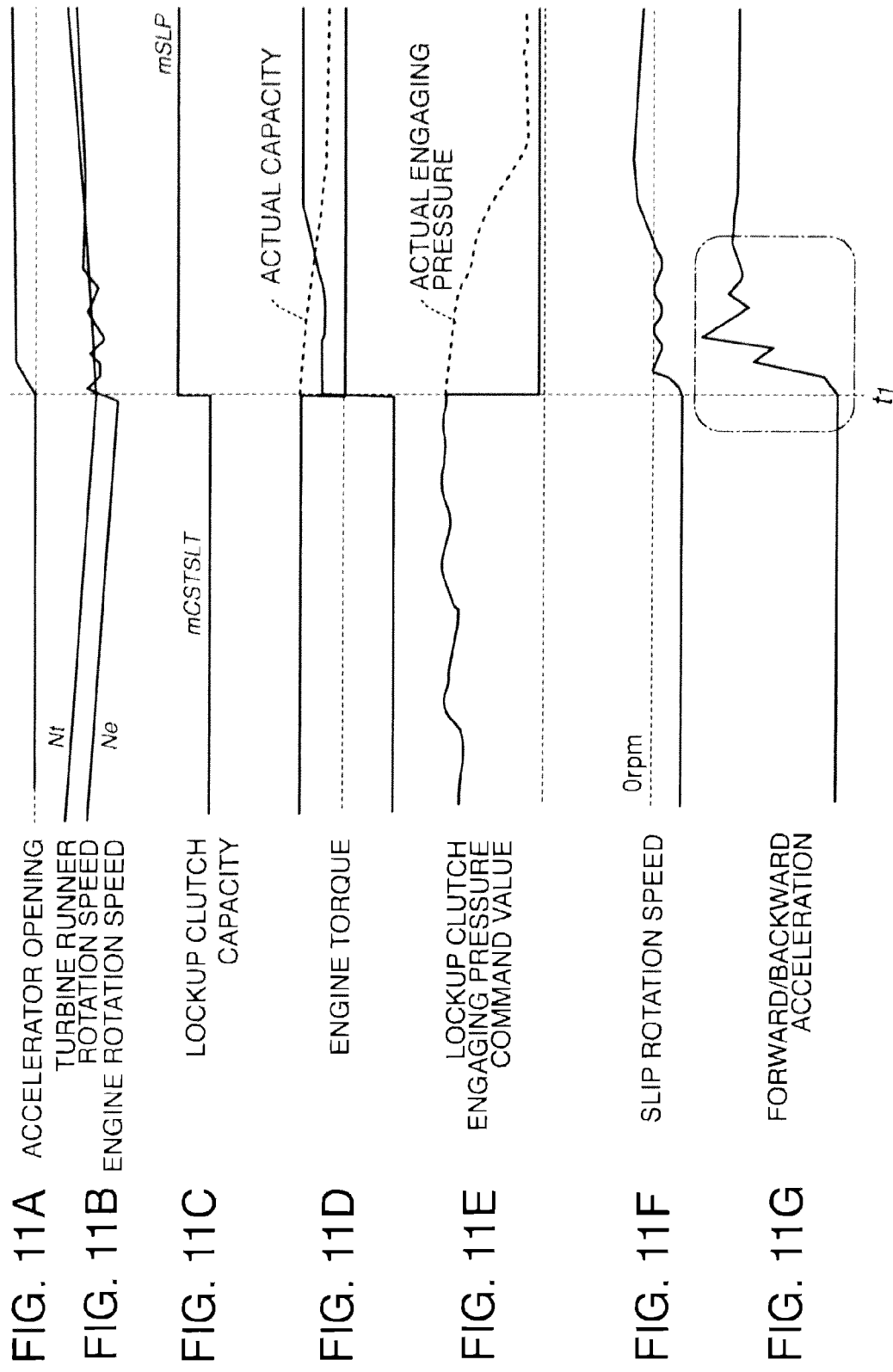

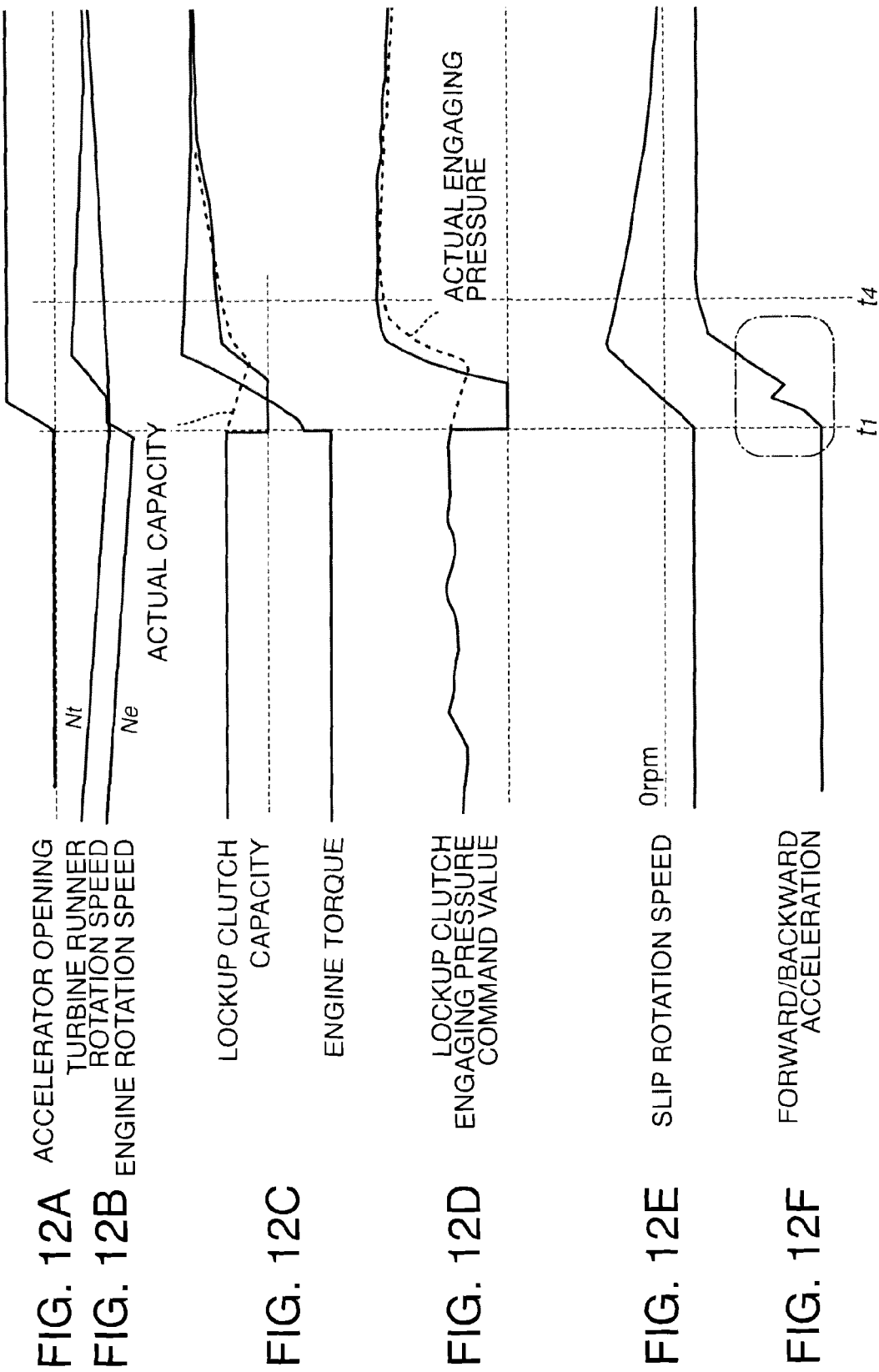

VEHICLE DRIVING DEVICE AND VEHICLE DRIVING METHOD

FIELD OF THE INVENTION

This invention relates to output power control of an internal combustion engine relating to a lockup clutch operation of a vehicle.

BACKGROUND OF THE INVENTION

In a vehicle in which an output power of an internal combustion engine is transmitted to a drive wheel via an automatic transmission and a lockup clutch, there is known a technique of suppressing fuel consumption during a coast running in which a driver does not depress an accelerator pedal by performing so-called a fuel cut, i.e., cutting off fuel supplied to the internal combustion engine.

As a rotation speed of the internal combustion engine decreases during a coast running, fuel supply to the internal combustion engine is resumed from the fuel cut-off, which is hereinafter referred to as a fuel recovery, and the lockup clutch disengages.

At this moment, it is necessary to prevent a timing difference between the fuel recovery and the disengagement of the lockup clutch from generating a torque shock. For this purpose, JP 2006-15819A, published by the Japan Patent Office in 2006, proposes to perform a regenerative braking during fuel recovery.

SUMMARY OF THE INVENTION

Meanwhile, in some cases, a driver may weakly depress an accelerator pedal without intention during a coast running of a vehicle. Even in this case, if the lockup clutch is not disengaged, an increase in the engine speed caused by depression of the accelerator pedal is transmitted to a drive wheel. As a result, a vehicle travel speed changes. Such a change in the vehicle travel speed may make the driver or a passenger feel discomfort.

It is therefore an object of this invention to provide a device and method of driving a vehicle, capable of alleviating an influence on a vehicle travel speed caused by minute unintentional depression of an accelerator pedal during a coast running by controlling an internal combustion engine.

In order to achieve the above object, a vehicle driving device according to this invention comprises an internal combustion engine generating an output power by combustion of fuel supplied in response to a depression of an accelerator pedal of a vehicle while performing a fuel cut during a coast running of the vehicle in which the accelerator pedal is not depressed. The device further comprises a torque converter that transmits the output power of the internal combustion engine to a drive wheel of the vehicle and a lockup clutch that is engaged, when the vehicle performs the coast running, to lock up the torque converter.

Still further, the device comprises an accelerator pedal depression sensor that detects a depression amount of the accelerator pedal during the coast running and a programmable controller.

The controller is programmed to operate the lockup clutch to disengage in response to the depression of the accelerator pedal during the coast running of the vehicle, and suppress a fuel recovery in response to the depression of the accelerator pedal until an engaging pressure of the lockup clutch decreases to a pressure equal to or less than a predetermined pressure.

The details as well as other features and advantages of this invention are set forth in the remainder of the specification and are shown in the accompanying drawings.

BRIEF DESCRIPTION OF THE DRAWINGS

FIGS. 3A to 3F are timing charts illustrating a result of the fuel recovery control routine executed by the engine controller according to the first embodiment of this invention in a condition of a minute accelerator opening equal to or smaller than a fuel recovery determination value;

FIGS. 4A to 4F are timing charts illustrating a result of the fuel recovery control routine executed by the engine controller according to the first embodiment of this invention in a condition of an accelerator opening exceeding the fuel recovery determination value;

FIGS. 10A to 10F are timing charts illustrating a result of the fuel recovery control routine executed by the engine controller according to the fourth embodiment of this invention in the condition of the minute accelerator opening;

FIGS. 11A to 11G are timing charts illustrating a result of fuel recovery in the condition of the minute accelerator opening when fuel recovery control according to this invention is not applied; and FIGS. 12A to 12F are timing charts illustrating a result of fuel recovery in the condition of the accelerator opening exceeding the minute accelerator opening when fuel recovery control according to this invention is not applied.

DESCRIPTION OF THE PREFERRED EMBODIMENTS

Figure 1:
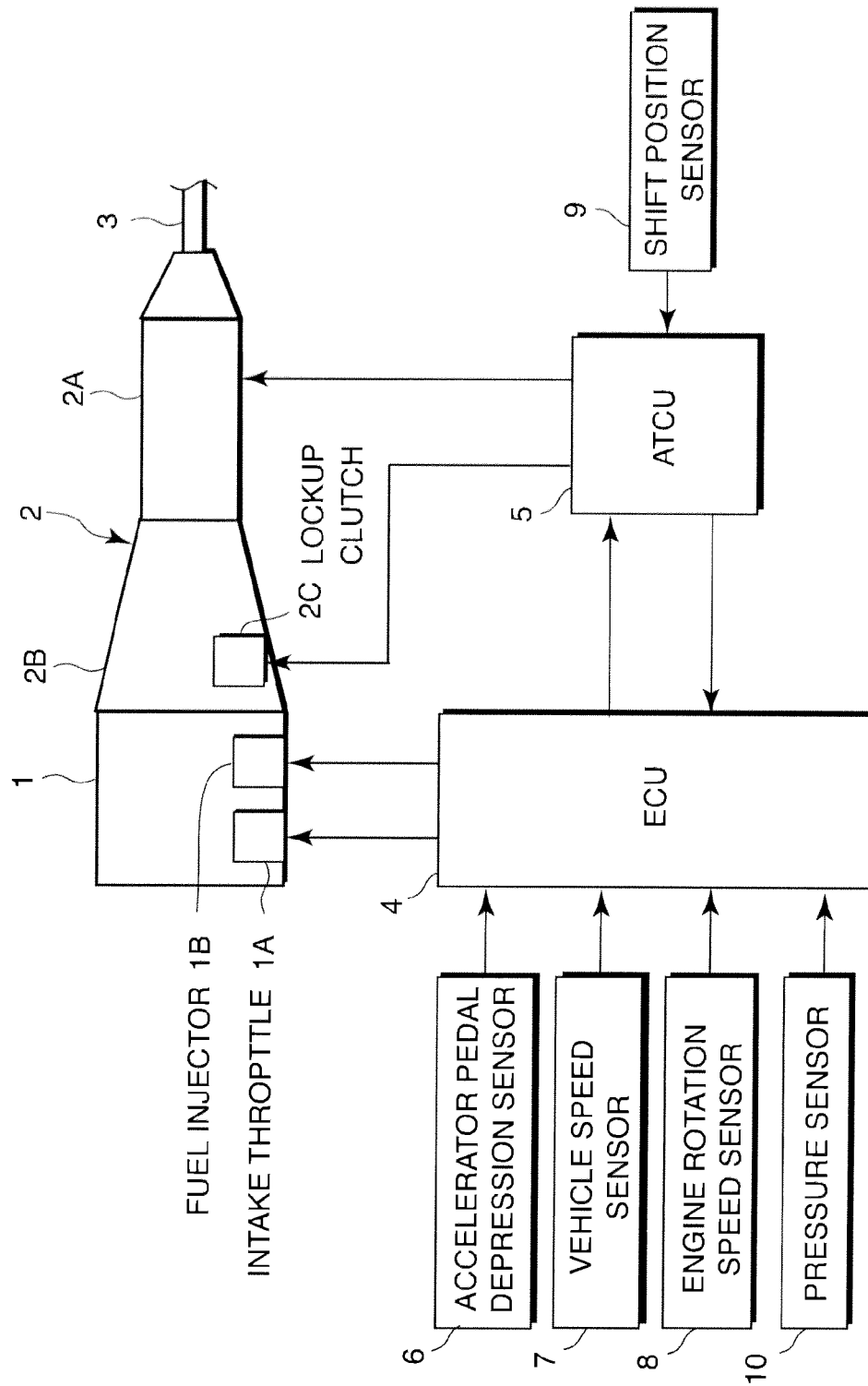
FIG. 1 is a schematic block diagram illustrating a vehicle driving device, comprising a fuel recovery control device according to a first embodiment of this invention.

Referring to FIG. 1 of the drawings, a vehicle driving device comprises an internal combustion engine 1 and a transmission unit 2 that performs gear shifting for the rotation output power from the internal combustion engine 1 and outputs it to a propeller shaft 3.

The internal combustion engine 1 comprises an intake throttle 1A and a fuel injector 1B.

The transmission unit 2 comprises a torque converter 2B, an automatic transmission 2A that performs gear shifting for the rotation power output from the torque converter 2B, and a hydraulic lockup clutch 2C.

The torque converter 2B has a structure known in the art, including a pump impeller linked to a rotation shaft of the internal combustion engine 1 and a turbine runner coupled to an input shaft of the automatic transmission 2A, in which a torque is transferred using a hydraulic fluid interposed between the pump impeller and the turbine runner. The automatic transmission 2A is a planetary gear set known in the art, including a high clutch and a low brake.

The lockup clutch 2C, when engaged, directly connects the pump impeller and the turbine runner. When disengaged, the lockup clutch 2C frees up engagement between the pump impeller and the turbine runner.

The engaging and disengaging operations in the lockup clutch 2C and each of the high clutch and the low brake of the automatic transmission 2A are performed by the automatic transmission controller (ATCU) 5 using a pump pressure of a hydraulic pump provided as an accessory of the internal combustion engine 1.

The engine controller (ECU) 4 controls an opening rate of the intake throttle 1A for adjusting an intake air amount of the internal combustion engine 1 and fuel injection of the fuel injector 1B of the internal combustion engine 1.

Each of the ECU 4 and the ATCU 5 is constituted by a microcomputer comprising a central processing unit (CPU), a read-only memory (ROM), a random access memory (RAM), and an input/output interface (I/O interface). One of the ECU 4 and the ATCU 5 or both of them may be constituted by a plurality of microcomputers. Alternatively, the ECU 4 and the ATCU 5 may be constituted by a single microcomputer.

The ECU 4 receives, via a signal circuit, each detection data from an accelerator pedal depression sensor 6 that detects a depression amount the accelerator pedal or an accelerator opening of a vehicle, a vehicle speed sensor 7 that detects a vehicle travel speed, arid an engine rotation speed sensor 8 that detects a rotation speed of the internal combustion engine 1.

The ATCU 5 receives detection data from a shift position sensor 9 that detects a selected position of a selector of a vehicle via a signal circuit.

Figure 2:
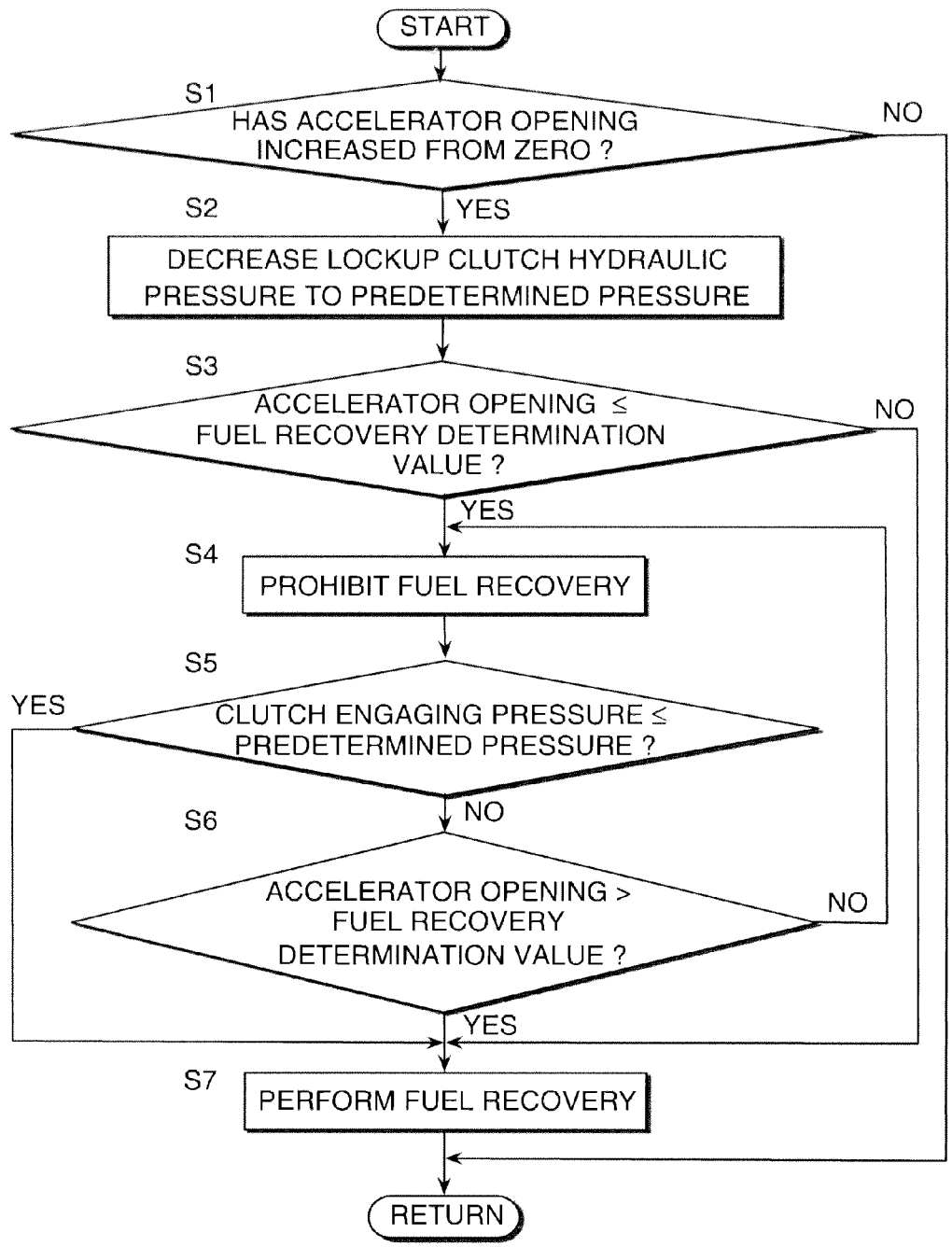
FIG. 2 is a flowchart illustrating a fuel recovery control routine executed by an engine controller according to the first embodiment of this invention.

Referring next to FIG. 2, a fuel recovery control routine executed by the ECU 4 as the accelerator pedal is depressed during a coast running will be described. The ECU 4 repeatedly executes this routine while a vehicle travels, That is, after a routine is terminated, the subsequent routine starts immediately.

In a step S1, the ECU 4 determines whether or not the accelerator opening has increased from zero based on the input data from the accelerator pedal depression sensor 6. Specifically, the determination is affirmative if the accelerator opening on the occasion of the previous routing execution is zero, and the accelerator opening on the occasion of the current routine execution is not zero. This means that a driver has depressed the accelerator pedal during a coast running of a vehicle.

Otherwise, that is, if the accelerator opening on the occasion of the previous routine execution is not zero, or if the accelerator opening on the occasion of the current routine execution is zero, the determination is negative. It should be noted that, if the accelerator opening is zero while a vehicle travels, it means that a vehicle travels by virtue of an inertial force, or in other words the vehicle is coast running. Herein, a state where the accelerator opening is zero corresponds to a state where the accelerator pedal is not depressed, or in other words to a throttle opening with which the engine runs idle.

If the determination in the step S1 is negative, the ECU 4 does not perform the subsequent processing and terminates the routine.

If the determination in the step S1 is affirmative, it means that a driver has depressed the accelerator pedal during the coast running of the vehicle. In this case, the ECU 4 outputs a signal for decreasing a hydraulic pressure of the lockup clutch 2C to a predetermined pressure via the ATCU 5 in a step S2. The predetermined pressure is set to a hydraulic pressure at which a lockup clutch capacity of the lockup clutch 2C is slightly lower than an output torque of the internal combustion engine 1 after the fuel recovery is obtained.

In a subsequent step S3, the ECU 4 determines whether or not the accelerator opening is equal to or smaller than a fuel recovery determination value. Specifically, it is determined whether or not the accelerator opening corresponds to a minute accelerator opening at which a gear shifting operation of the automatic transmission 2A is not generated. The fuel recovery determination value is set to, for example, 0.5/8 providing that a maximum accelerator opening is at 8/8.

If the determination in the step S3 is negative, the ECU 4 performs fuel recovery in a step S7, thereby causing a fuel injection amount to increase in response to a request of increasing the output power of the internal combustion engine 1 represented by the accelerator opening. The determination in the step S3 becomes negative when, for example, the accelerator pedal is depressed notably such as in a kick-down operation..

If the determination in the step S3 is affirmative, the ECU 4 prohibits fuel recovery in a step S4. After the processing of the step S4, the ECU 4 performs a determination of a step S5.

In the step S5, the ECU 4 determines whether or not the engaging pressure of the lockup clutch 2C has decreased to the predetermined pressure designated in the step S2. This determination may be performed using various methods.

As a direct method, the engaging pressure of the lockup clutch 2C may be actually measured using the pressure sensor 10, and the measured value may be compared to a predetermined pressure. According to this method, it is possible to reliably assess the engaging pressure of the lockup clutch 2C.

Alternatively, it may be determined whether or not a predetermined time has elapsed since the start of the process of the step S2. The predetermined time may be defined based on a measurement result obtained in advance by measuring a time elapsing until the engaging pressure of the lockup clutch 2C actually decreases to a predetermined pressure after a signal for decreasing a pressure to a predetermined pressure is output to the lockup clutch 2C. If this determination method is employed, it is possible to omit the pressure sensor 10 used to detect the engaging pressure of the lockup clutch 2C.

Alternatively, the rotation speed of the pump impeller of the torque converter 2B may be used. Specifically, the aforementioned determination may be performed by detecting the rotation speed Ne of the internal combustion engine 1 detected by the engine rotation speed sensor 8 and the rotation speed Nt of the turbine runner of the torque converter 2B and determining whether or not an absolute value of a slip rotation speed, which is a difference between the rotation speeds Ne and the Nt, exceeds a predetermined rotation speed. The rotation speed Nt of the turbine runner is obtained from a vehicle travel speed detected by the vehicle speed sensor 7 and a selector position detected by the shift position sensor 9. The predetermined rotation speed may be set based on a result of experiment or simulation performed in advance for the slip rotation speed at the predetermined pressure designated in the step S2. Similarly, when this determination method is employed, it is possible to omit the pressure sensor 10.

If it is determined that the hydraulic pressure of the lockup clutch 2C has decreased to the predetermined pressure in the step S5, it means that the lockup clutch 2C disengages so that a change of the engine rotation speed caused by fuel recovery can be absorbed by the torque converter 2B. In this case, the ECU 4 performs fuel recovery in the step S7. After the fuel recovery, the ECU 4 terminates the routine.

Meanwhile, if it is determined that the hydraulic pressure of the lockup clutch 2C has not decreased to the predetermined pressure in the step S5, the ECU 4 determines if a recovery delay condition is satisfied in a step S6.

Specifically, this determination is made by determining whether or not the accelerator opening is greater than the fuel recovery determination value 0.5/8. If the accelerator opening is greater than the fuel recovery determination value 0.5/8, it means that the accelerator opening has exceeded a target accelerator opening region for the recovery delay control. In this case, the ECU 4 performs fuel recovery in the step ST After the fuel recovery, the ECU 4 terminates the routine. Even when the accelerator opening is equal to or lower than the fuel recovery determination value 0.5/8 at the routine start timing, if the accelerator opening exceeds the fuel recovery determination value 0.5/8 during the routine execution, the fuel recovery is immediately executed since the determination in the step S6 changes to be affirmative from negative. As a result, a high response is ensured with respect to the accelerator pedal depression so as to accelerate a vehicle.

In the step S6, when the accelerator opening does not exceed the fuel recovery determination value 0.5/8, the ECU 4 determines that the recovery delay condition is satisfied. In this case, the ECU 4 repeats the processing subsequent to the step S4 to suspend the furl recovery.

As described above, in this routine, for minute accelerator pedal depression during a coast running, a processing for decreasing the engaging pressure of the lockup clutch 2C immediately starts, and recovery from the fuel cut-off state is delayed until the engaging pressure of the lockup clutch decreases to a level at which a torque shock can be absorbed. Therefore, it is possible to alleviate an influence on a travel speed caused by minute unintentional depression of the accelerator pedal during a coast running and prevent the driver or the passenger from feeling discomfort.

Referring to FIGS. 3A-3F, a result of the fuel recovery control routine executed by the ECU 4 in a condition of a minute accelerator opening equal to or smaller than a fuel recovery determination value will be described.

During a coast running of the vehicle, a fuel cut-off operation is executed and the accelerator opening keeps zero as illustrated in FIG. 3A. Meanwhile, the ATCU 5 maintains the engaging pressure of the lockup clutch 2C as illustrated in FIG. 3D, and the lockup clutch capacity is maintained in the value of the engagement state as illustrated in FIG. 3C. Here, the lockup clutch capacity means a maximum transmittable torque in the current engagement state of the lockup clutch 2C.

An engine brake is applied in this state to the vehicle travelling by virtue of an inertial force, so that the engine rotation speed Ne, that is, a rotation speed of the pump impeller of the torque converter 2B, is slightly lower than the rotation speed Nt of the turbine runner as illustrated in FIG. 3B. Therefore, the slip rotation speed being a difference between the two rotation speeds, has a negative value as illustrated in FIG. 3E.

In the fuel recovery control routine executed in this state, the determination in the step S1 is negative. Therefore, the fuel recovery is not executed, and the fuel cut-off state is maintained.

At a time t1, as the driver slightly depresses the accelerator pedal, the determination of the step S1 changes to be affirmative in the subsequent execution of the fuel recovery control routine. As a result, in the step S2, the ECU 4 outputs a command signal for decreasing the engaging pressure to the lockup clutch 2C via the ATCU 5 as illustrated in FIG. 3D. Due to a response delay in a hydraulic pressure used to generate the engaging pressure, even when an engaging pressure command value decreases in a stepwise fashion, both an actual engaging pressure indicated by the dotted line in FIG. 3D and an actual lockup capacity indicated by the dotted line in FIG. 3C decrease gradually.

When the accelerator pedal depression amount is minute, the determination of the step S3 in the fuel recovery control routine changes to be affirmative, and fuel recovery is prohibited in the step S4. The fuel recovery is continuously prohibited in the step S4 until the engaging pressure of the lockup clutch 2C becomes equal to or lower than the predetermined pressure at a time t2.

As the engaging pressure of the lockup clutch 2C decreases to the predetermined pressure or lower at the time t2, the determination of the step S5 changes to be affirmative. As a result, the fuel recovery operation in the step S7 is executed, and fuel supply to the internal combustion engine 1 is resumed.

As a result, the engine torque at the time t2 increases as illustrated in FIG. 3C, and the engine rotation speed Ne also increases as illustrated in FIG. 3B. At this moment, as illustrated in FIGS. 3C and 3D, the lockup clutch 2C has disengaged. For this reason, as illustrated in FIG. 3B, the engine rotation speed Ne finally exceeds the rotation speed Nt of the turbine runner, which is an input rotation speed of the automatic transmission 2A. The slip rotation speed corresponding to the speed difference there-between temporarily increases as illustrated in FIG. 3E. However, since the speed difference is absorbed in the torque converter 2B, the slip rotation speed thus increased converges to zero.

An acceleration of the vehicle in a forward/backward direction is maintained constant during a coast running as illustrated in FIG. 3F, and a deceleration starts to decrease at the time t1 in which the command for decreasing the engaging pressure command value of the lockup clutch 2C is output. In addition, the deceleration smoothly decreases toward zero until the vehicle speed becomes constant after the time t2.

If the fuel recovery control routine is executed as described above, an unintentional change of the vehicle travel speed is suppressed when the driver slightly depresses the accelerator pedal during a coast running of the vehicle. Therefore, it is possible to prevent the driver or the passenger from feeling discomfort caused by minute unintentional accelerator pedal depression.

Referring to FIGS. 11A to 11G, description will now be made for a vehicle behavior when the accelerator pedal is slightly depressed not exceeding the fuel recovery determination value during the coast running of the vehicle, and the fuel recovery control routine according to this invention is not executed.

In this case, a vehicle coasts, that is, the internal combustion engine has a negative driving force, and the lockup clutch is engaged until the time t1 as illustrated in FIG. 11C. This state will be referred to as a coast lockup state mCSTSLT. As a driver slightly depresses the accelerator pedal at the time t1, the ECU 4 outputs a command value for decreasing the engaging pressure to the lockup clutch 2C as illustrated in FIG. 11E via the ATCU 5. At the same time, the ECU 4 executes fuel recovery. As a result, the engine torque starts to increase from timing t1 as illustrated in FIG. 11D.

After the time t1, a vehicle drives normally in pattern, that is, the internal combustion engine has a positive driving force, and the lockup clutch slips. This state will be referred to as a drive slip state mSLP. However, in practice, due to a response delay in the hydraulic pressure of the lockup clutch 2C, the engaging pressure decreases gradually as indicated by the dotted line in FIG. 11E. Therefore, the lockup clutch capacity of FIG. 11D also decreases gradually.

In this manner, as the engine torque increases in a state that the lockup clutch 2C maintains a high clutch capacity, in other words, in a substantial engagement state, the increasing engine torque is directly applied to the propeller shaft 3 via the lockup clutch 2C. As a result, as indicated by the area enclosed by the dot-dashed line in FIG. 11G, an acceleration of a vehicle in a forward/backward direction abruptly changes to generate a shock in a chassis or make a driver or a passenger feel discomfort.

Referring next to FIGS. 4A-4F, description will be made for a result of the fuel recovery control routine executed by the ECU 4 when the accelerator pedal is depressed beyond the fuel recovery determination value 0.5/8.

In this case, the operation similar to that of FIGS. 3A to 3F is performed until the time t1. As the accelerator pedal is depressed at the time t1, the determination of the step Si changes to be affirmative in the subsequent execution of the fuel recovery control routine, and the ECU 4 outputs a command value for decreasing the engaging pressure to the lockup clutch 2C via the ATCU 5 in the step S2 as illustrated in FIG. 4D. Due to a response delay in the hydraulic pressure, as the engaging pressure command value decreases, both the actual engaging pressure indicated by the dotted line in FIG. 4D and the lockup clutch capacity indicated by the dotted line of FIG. 4C decrease gradually.

Since the determination in the step S6 is negative until the accelerator opening exceeds 0.5/8, the fuel recovery is repeatedly prohibited in the step S4.

As the accelerator opening exceeds 0.5/8 at the time t3, the determination of the step S6 changes to be affirmative, and the fuel recovery is executed in the step S7. Since the determination of the step S3 becomes negative in the subsequent execution of the routine, the fuel recovery is repeatedly executed.

As a result, as illustrated in FIG. 4C, the engine torque increases at the time t3. Thereafter, the engine torque is generated depending on the depression level of the accelerator pedal.

When the accelerator opening exceeds the fuel recovery determination value 0.5/8 at the time t3, the fuel recovery starts immediately. As a result, as indicated by the area enclosed by the dotted line of FIG. 4F, an acceleration of a vehicle in a forward/backward direction changes to a positive value after the time t3.

In this fuel recovery control routine, as the accelerator opening exceeds the fuel recovery determination value, the fuel recovery is executed regardless of the lockup clutch capacity. The lockup clutch 2C is re-engaged when the engine torque is recovered to a certain level through the fuel recovery.

That is, when a driver intends to accelerate the vehicle and depresses the accelerator pedal, the fuel recovery is executed immediately. Therefore, it is possible to prevent acceleration caused by depressing the accelerator pedal from being delayed. Accordingly, it is possible to accelerate the vehicle promptly in response to depression of the accelerator pedal.

Therefore, according to this embodiment, as the accelerator pedal is depressed during a coast running, it is possible to prevent a shock caused by a timing deviation between disengagement of the lockup clutch 2C and fuel recovery without degrading acceleration performance of a vehicle.

Referring to FIGS. 12A to 12F, description will now be made for a vehicle behavior when the accelerator pedal is depressed over the fuel recovery determination value during a coast running of a vehicle, and the fuel recovery control routine according to this invention is not executed.

In this case, as a driver depresses the accelerator pedal at the time t1, the ECU 4 outputs a command value for decreasing the engaging pressure to the lockup clutch 2C via the ATCU 5 as illustrated in FIG. 12D. At the same time, the ECU 4 executes the fuel recovery. As a result, the engine torque starts to increase from the time t1 as illustrated in FIG. 12C.

Meanwhile, even when a command value for decreasing the engaging pressure is output to the lockup clutch 2C, due to a response delay of the hydraulic pressure, both the actual engaging pressure indicated by the dotted line of FIG. 12D and the lockup clutch capacity indicated by the dotted line of FIG. 12C decrease with a delay as the engaging pressure command value decreases.

As a result, the engine torque increases while the lockup clutch 2C is not substantially disengaged. That is, since the increasing engine torque is directly transmitted to the propeller shaft 3, a fluctuation is generated in the acceleration of a vehicle in a forward/backward direction as indicated by the area enclosed by the dot-dashed line of FIG. 12F. This generates a shock in a chassis and makes the driver or a passenger feel discomfort.

Figure 5:
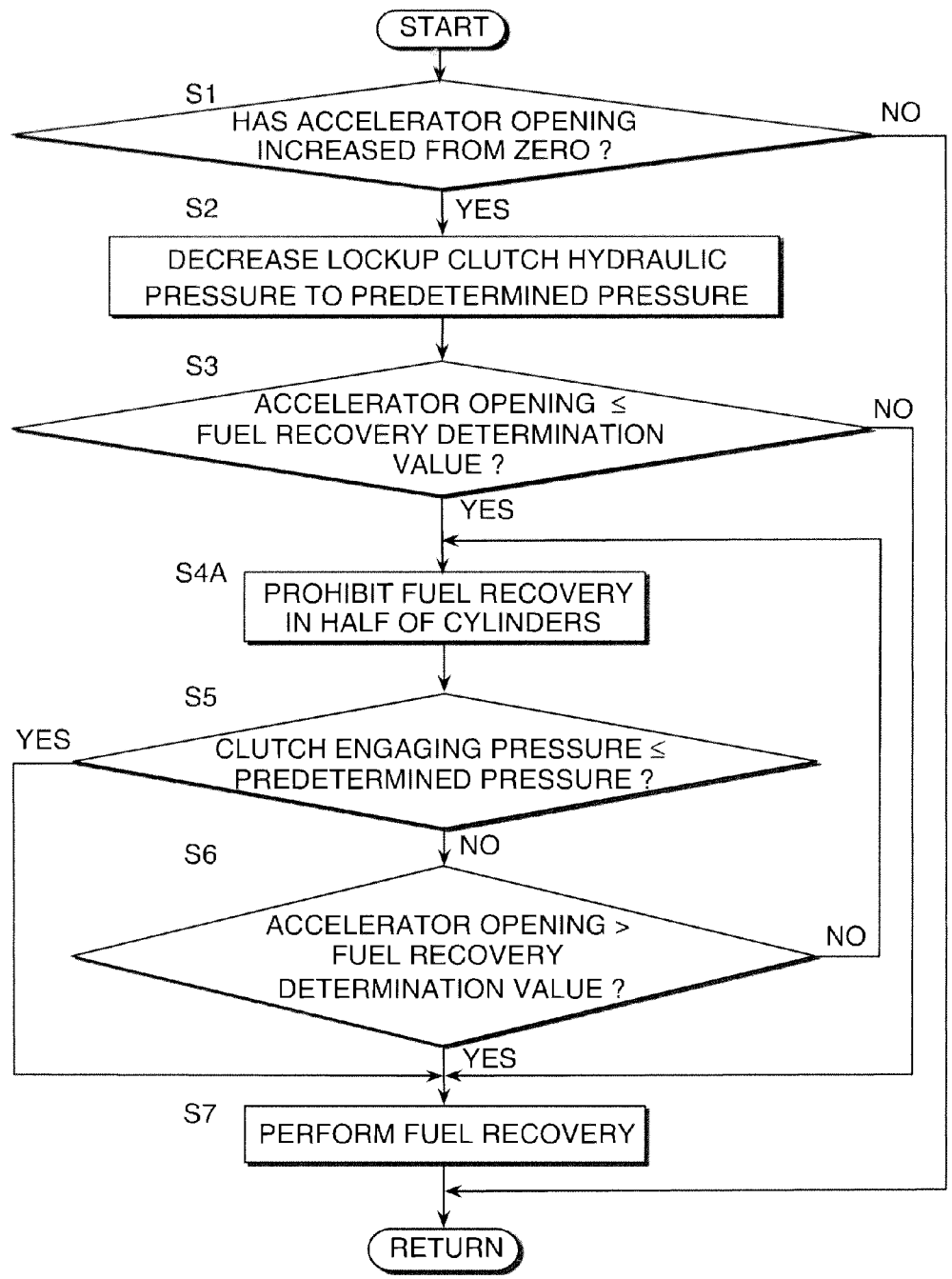
FIG. 5 is a flowchart illustrating a fuel recovery control routine executed by the engine controller according to a second embodiment of this invention.

Referring to FIG. 5, the fuel recovery control routine executed by the ECU 4 according to the second embodiment of this invention will be described. This routine is executed instead of the fuel recovery control routine of FIG. 2 of the first embodiment. Therefore, a routine execution condition is identical to that of the first embodiment.

This fuel recovery control routine is different from that of FIG. 2 in that the step S4 is substituted with a step S4A. The steps S1 to S3 and the steps S5 to S7 are identical to those of FIG. 2.

When the determination in the step S3 is affirmative, the ECU 4 prohibits the fuel recovery in a half of cylinders of the internal combustion engine 1 in the step S4A. That is, if the internal combustion engine 1 has eight cylinders, the fuel recovery is prohibited in four cylinders, and the fuel recovery is performed in the remaining four cylinders.

The number of cylinders where the fuel recovery is prohibited may not be necessarily set to a half of the cylinders. By prohibiting the fuel recovery in a part of the cylinders, the output power of the internal combustion engine 1 is suppressed to a low value, compared to a case where the fuel recovery is performed in overall cylinders.

It is conceivable that the fuel recovery is once prohibited in overall cylinders as the accelerator pedal is depressed, and then, the prohibition of the fuel recovery is released sequentially one by one as time elapses. In this case, it is possible to smoothly increase the output torque of the internal combustion engine 1.

Referring to FIGS. 6A to 6F, a result of executing the fuel recovery control routine according to the second embodiment will be described. In this case, it is assumed that the fuel recovery is prohibited in a half of the cylinders in the step S4A.

Figure 6:
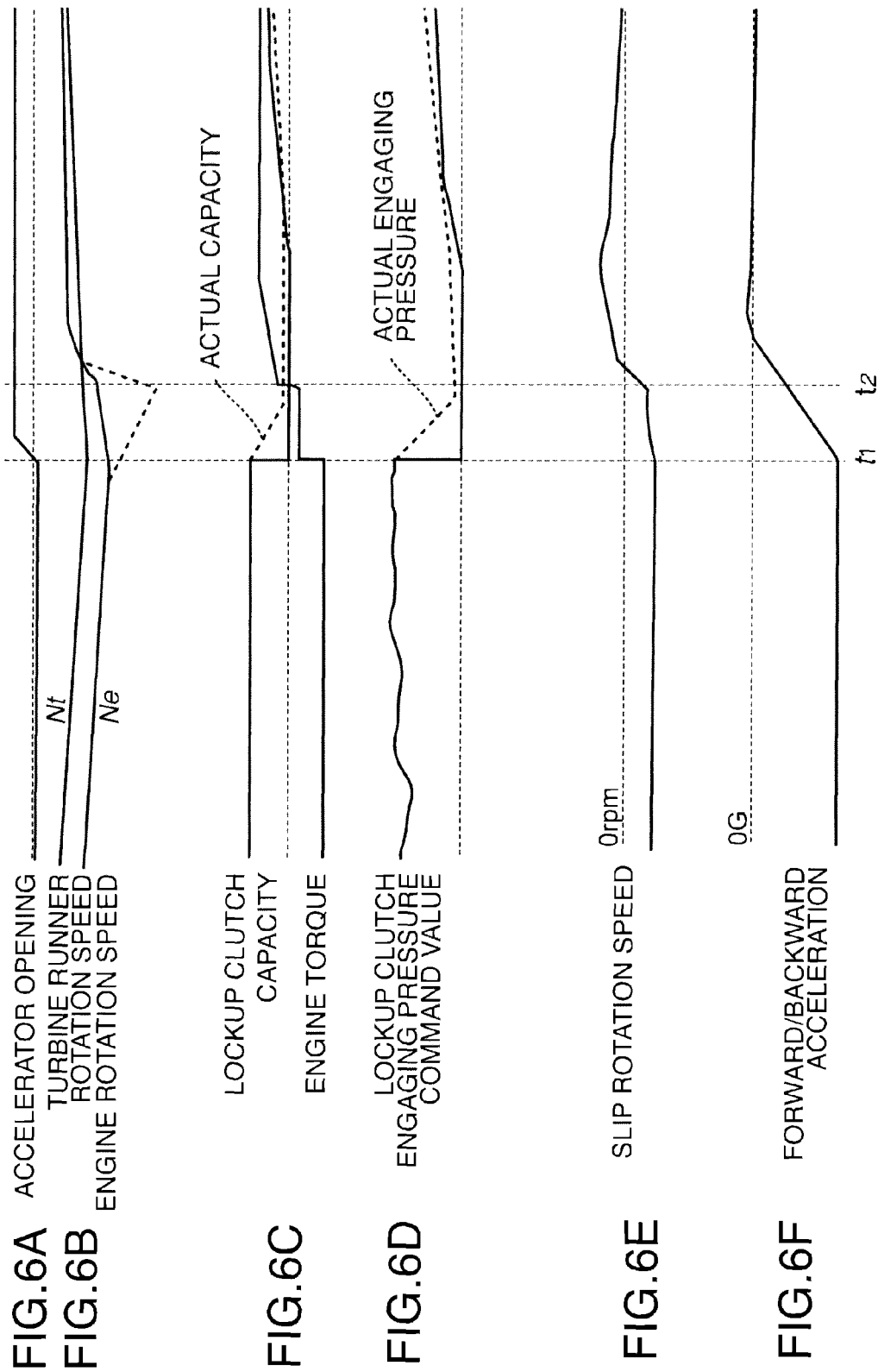
FIGS. 6A to 6F are timing charts illustrating a result of the fuel recovery control routine executed by the engine controller according to the second embodiment of this invention in the condition of the minute accelerator opening.

In this embodiment also, the conditions until the time t1 are identical to those of FIGS. 3A to 3F. As a driver slightly depresses the accelerator pedal at the time t1, the determination in the step S1 changes to be affirmative. As a result, in the step S2, the ECU 4 outputs a command value for decreasing the engaging pressure to the lockup clutch 2C via the ATCU 5 as illustrated in FIG. 6D. Due to a response delay of the hydraulic pressure, both the actual engaging pressure indicated by the dotted line in FIG. 6D and the lockup capacity indicated by the dotted line in FIG. 6C decrease gradually in contrast to a sudden decrease in the engaging pressure command value.

Meanwhile, since the determination in the step S3 becomes affirmative, the fuel recovery is prohibited in a half of the cylinders in the step S4A. As a result, the engine torque slightly increases, compared to that of the coast running, as illustrated in FIG. 6C. In this state, while the lockup clutch 2C maintains a high clutch capacity, an increase in the engine torque is small. Therefore, as illustrated in FIG. 6F, an acceleration of a vehicle in a forward/backward direction stably increases without fluctuation.

If the fuel recovery is prohibited for overall cylinders, the engine rotation speed Ne may decrease as the lockup clutch 2C disengages as indicated by the dotted line of FIG. 6B. However, since the fuel recovery is prohibited in a part of the cylinders, but is allowed in the remaining cylinders, the engine torque slightly increases as a whole. Therefore, a decrease in the engine rotation speed Ne due to a disengagement of the lockup clutch 2C does not occur.

In this manner, as the engaging pressure of the lockup clutch 2C decreases to the predetermined pressure at the time t2, the prohibition of the fuel recovery in the half of the cylinders is released in a step S7. As a result, the engine torque increases again, and thereafter the engine torque changes depending on the accelerator depression level. At this moment, since the engaging pressure of the lockup clutch 2C has decreased to the predetermined pressure, the lockup clutch 2C is substantially disengaged.

Therefore, an increase in the engine torque does not abruptly change the torque transmitted to the propeller shaft 3, but temporarily increases the slip rotation speed as illustrated in FIG. 6E. As a result, an acceleration of a vehicle in a forward/backward direction stably increases without fluctuation as illustrated in FIG. 6F.

Figure 7:
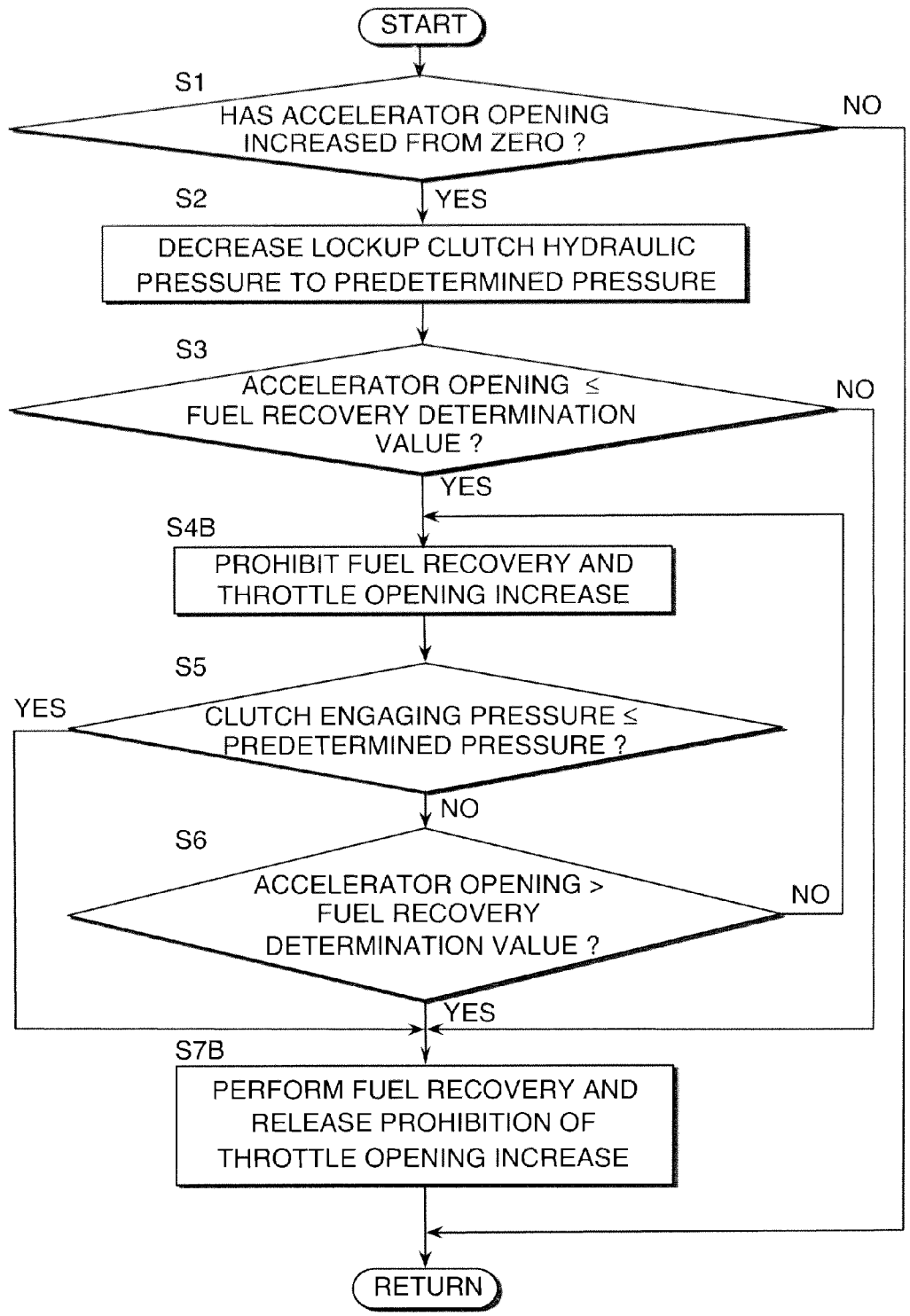
FIG. 7 is a flowchart illustrating a fuel recovery control routine executed by an engine controller according to a third embodiment of this invention.
Figure 8:
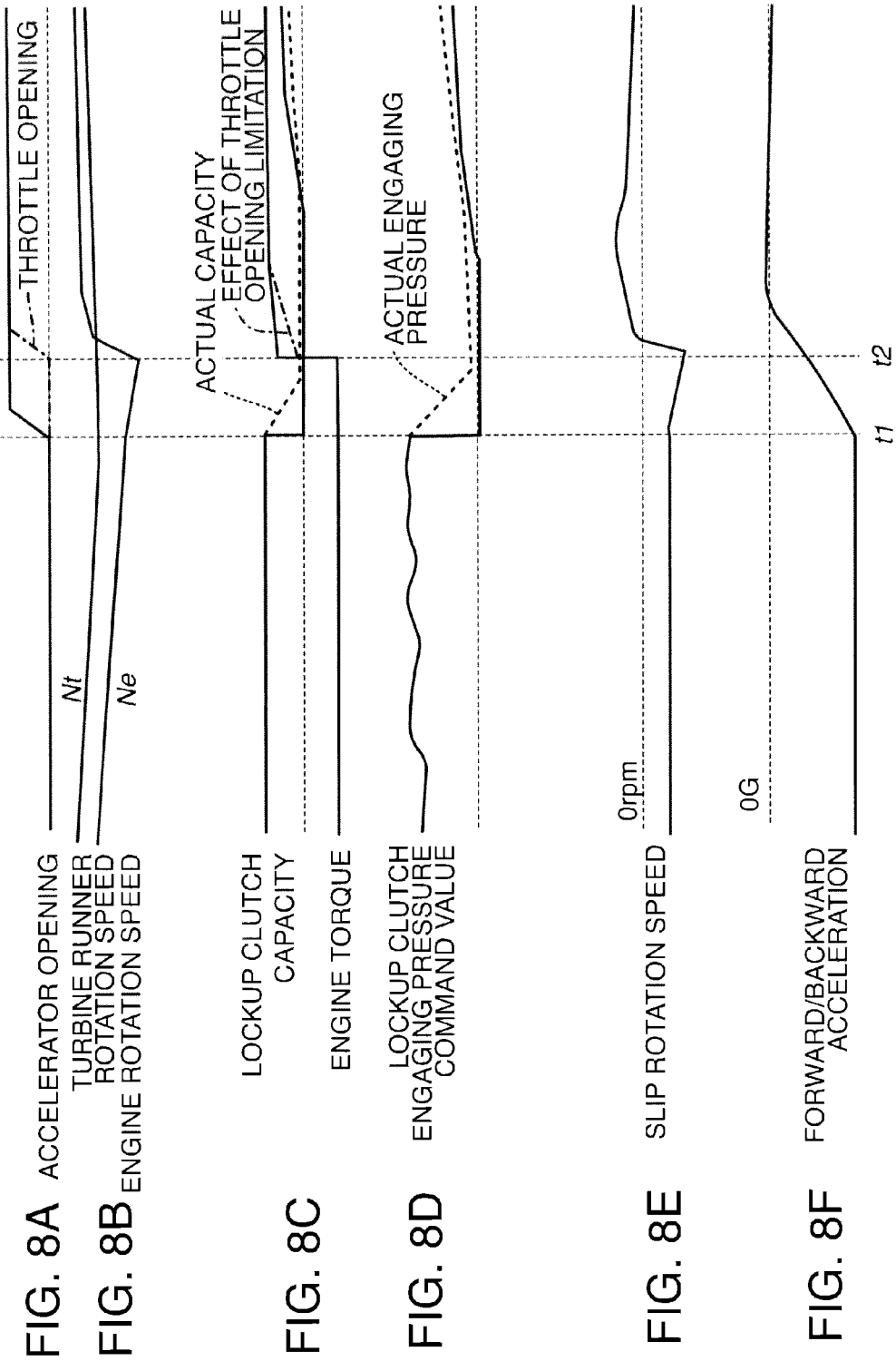
FIGS. 8A to 8F are timing charts illustrating a result of fuel recovery control routine executed by the engine controller according to the third embodiment of this invention in the condition of the minute accelerator opening.

Referring to FIG. 7, a fuel recovery control routine executed by the ECU 4 according to the third embodiment of this invention will be described. This routine is executed instead of the fuel recovery control routine of FIG. 2 of the first embodiment. Therefore, the routine execution condition is identical to that of the first embodiment.

This fuel recovery control routine is different from that of FIG. 2 in that the step S4 is substituted with the step S4B, and the step S7 is substituted with the step S7B. Other steps are identical to those of the routine of FIG. 2.

In the step S4B, the ECU 4 prohibits fuel recovery in overall cylinders and prohibits the opening rate of the intake throttle 1A, that is, the throttle opening from increasing. Since the intake throttle 1A is synchronized with the accelerator pedal, the throttle opening increases as the accelerator pedal is depressed. In the step S4B, both the fuel recovery and the increase in the throttle opening are prohibited.

In the step S7B, the ECU 4 releases the prohibition of the fuel recovery and the increase in the throttle opening. As a result, fuel supply to the internal combustion engine 1 is resumed, and the opening rate of the intake throttle 1A increases depending on the depression of the accelerator pedal.

Referring next to FIGS. 8A to 8F, a result of executing the fuel recovery control routine according to the third embodiment will be described.

With this fuel recovery control routine, both the fuel recovery and the increase in the opening rate of the intake throttle 1A are prohibited in overall cylinders during a recovery delay period until the time t2 after a driver slightly depresses the accelerator pedal at the time t1. As the recovery delay period is terminated at the time t2, the throttle opening increases as indicated by the dot-dashed line in FIG. 8A. If the intake air amount of the internal combustion engine 1 is suppressed to a low level during the recovery delay period, the output torque caused by the fuel recovery smoothly increases, as indicated by the dot-dashed line in FIG. 8C, even when the fuel recovery is immediately performed at the time t2, due to a response delay of the intake air amount against an increase in the accelerator opening. On the contrary, if the throttle opening increases during the recovery delay period from the time t1 to the time t2 as indicated by the solid line in FIG. 8A, the fuel recovery is executed at the time t2, and the output torque abruptly increases as indicated by the solid line in FIG. 8C. According to this embodiment, it is possible to reduce a torque gap that may appear at the time t2 by suppressing an increase in the throttle opening during the recovery delay period. As a result, it is possible to suppress a shock caused by the torque gap. In addition, since the intake air amount in the fuel recovery is suppressed, it is possible to suppress an abrupt increase in the rotation of the internal combustion engine 1 immediately after the fuel recovery, thereby enabling smoothly re-engagement of the lockup clutch 2C.

Figure 9:
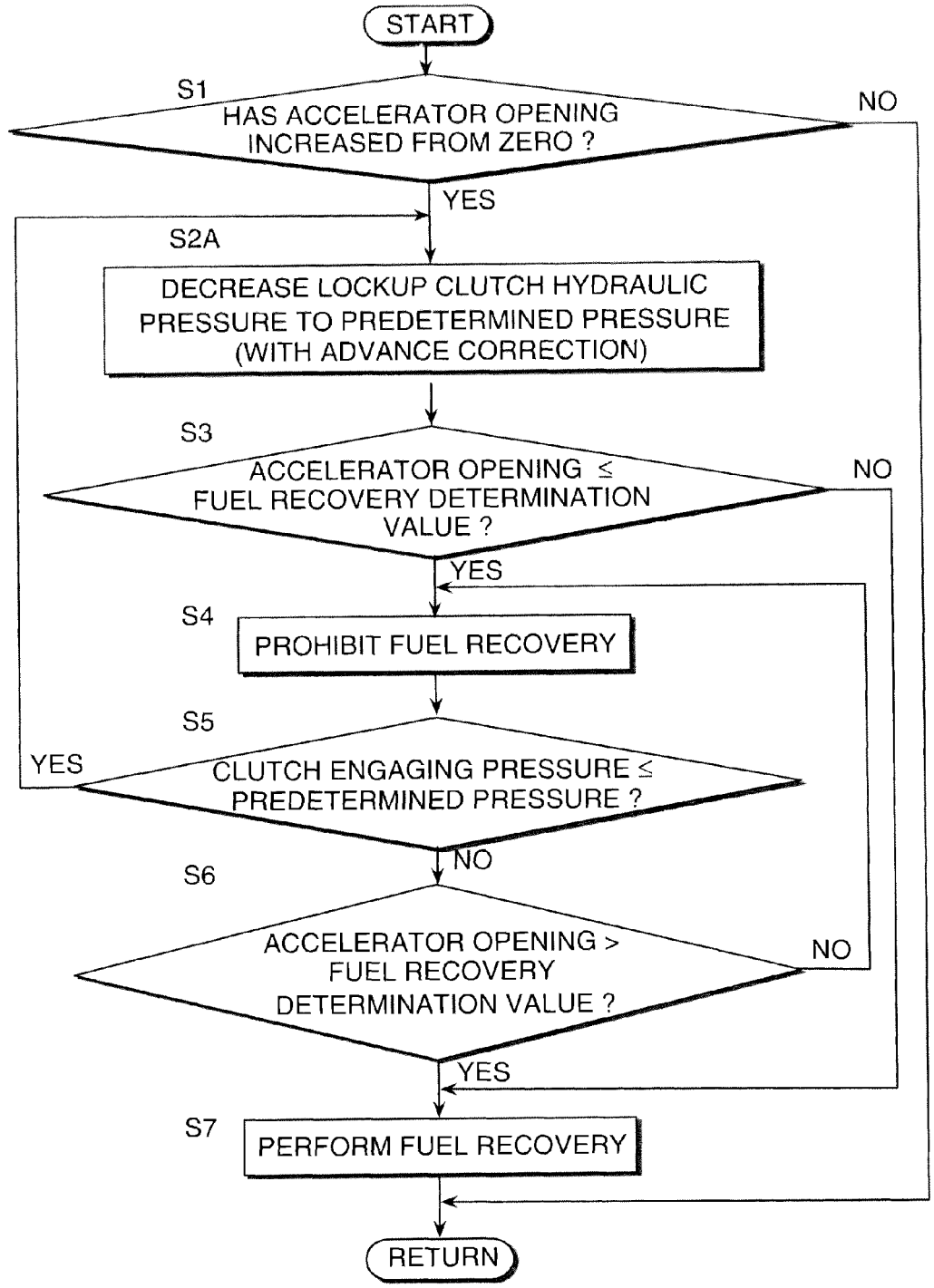
FIG. 9 is a flowchart illustrating a fuel recovery control routine executed by an engine controller according to a fourth embodiment of this invention.

Referring to FIG. 9, a fuel recovery control routine executed by the ECU 4 according to the fourth embodiment of this invention will be described. This routine is executed instead of the fuel recovery control routine of the first embodiment. The execution condition is identical to that of the first or second embodiment.

In this routine, the step S2 of the routine of FIG. 2 of the first embodiment is substituted with a step S2A. In addition, if the determination in the step S6 is negative, the processing is executed again not from the step S4, but from the step S2A.

In the step S2A, the ECU 4 applies an advance correction to the engaging pressure command value before it is output to the lockup clutch 2C. Specifically, by setting the engaging pressure command value to a value lower than the predetermined pressure, a decrease in the engaging pressure of the lockup clutch 2C is accelerated. In addition, the ECU 4 performs feedback control of the engaging pressure by repeatedly processing the steps S2A to S6 such that the engaging pressure of the lockup clutch 2C finally converges to the predetermined pressure. As a result, the processing of the step S2A is repeatedly executed from the time t1 at which the accelerator pedal is depressed to the time t2 at which the engaging pressure of the lockup clutch 2C decreases to the predetermined pressure.

Other steps are identical to those of the fuel recovery control routine of FIG. 2 of the first embodiment.

Referring to FIGS. 10A to 10F, a result of executing the fuel recovery control routine of FIG. 9 by the ECU 4 according to the fourth embodiment under a minute accelerator depression equal to or lower than the fuel recovery determination value will he described.

As a driver slightly depresses the accelerator pedal at the time t1 during a coast running of a vehicle, the ECU 4 outputs a command value for decreasing the engaging pressure to the lockup clutch 2C via the ATCU 5 in the step S2A as illustrated in FIG. 10D. By applying an advance correction to this command value, a decrease in the actual engaging pressure is expedited as indicated by the dot-dashed line of FIG. 10D, compared to a case where the advance correction is not applied as indicated by the dotted line. As a result, the recovery delay period from the time t1 to the time t2 at which the engaging pressure of the lockup clutch 2C decreases to the predetermined pressure is shortened.

During a period from the time t1 to the time t2, a process for decreasing the output power of the internal combustion engine 1 is repeatedly performed in the step S4A. As illustrated in FIG. 10C, the engine torque is suppressed to a low value until the engaging pressure of the lockup clutch 2C decreases to the predetermined pressure. Therefore, the acceleration of a vehicle in a forward/backward direction smoothly increases as illustrated in FIG. 10F. In addition, a shock due to an increase in the engine torque while the lockup clutch 2C is substantially engaged is not promoted.

In addition, according to this embodiment, by applying the advance correction to the engaging pressure command value of the lockup clutch 2C, the output power decreasing period of the internal combustion engine 1 from the time t1 to the time t2 is shortened. Therefore, it is possible to shorten a response time elapsing from the depression of the accelerator pedal to the increase in the vehicle travel speed.

As described above, according to this invention, when the accelerator pedal is slightly depressed during a coast running of a vehicle, the fuel recovery of the internal combustion engine is suppressed until the engaging pressure of the lockup clutch 2C decreases to a predetermined pressure or lower. Therefore, it is possible to prevent a driver or a passenger from feeling discomfort caused by an influence on a vehicle speed generated by increasing the output power of the internal combustion engine 1 while the lockup clutch 2C is substantially engaged.

The contents of Tokugan 2011-133649, with a filing date of Jun. 15, 2011 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

INDUSTRIAL FIELD OF APPLICATION

As described above, the vehicle driving device according to this invention prevents a passenger from feeling discomfort caused by a shock generated by fuel recovery and transmitted via a lockup clutch. Accordingly, this invention brings about a favorable result in improving a riding comfort of, for example, a passenger vehicle.

The embodiments of this invention in which an exclusive property or privilege is claimed are defined as follows:

1. A vehicle driving device, comprising:
an internal combustion engine generating an output power by combustion of fuel supplied in response to a depression of an accelerator pedal of a vehicle while performing a fuel cut during a coast running of the vehicle in which the accelerator pedal is not depressed;
a torque converter that transmits the output power of the internal combustion engine to a drive wheel of the vehicle via a pump impeller and a turbine runner;
a lockup clutch that is engaged, when the vehicle performs the coast running, to directly connect the pump impeller with the turbine runner;
an accelerator pedal depression sensor that detects a depression of the accelerator pedal during the coast running; and
a programmable controller programmed to:
operate the lockup clutch to disengage in response to the depression of the accelerator pedal during the coast running of the vehicle; and
suppress a fuel recovery of the internal combustion engine in response to the depression of the accelerator pedal during the coast running of the vehicle until an engaging pressure of the lockup clutch decreases to a predetermined pressure.

2. The vehicle driving device according to claim 1, wherein the controller is further programmed to prohibit the fuel recovery of the internal combustion engine in response to the depression of the accelerator pedal until the engaging pressure of the lockup clutch decreases to the predetermined pressure.

3. The vehicle driving device according to claim 2, wherein the internal combustion engine comprises a multi-cylinder engine and the controller is further programmed to prohibit the fuel recovery in only one or a few of the cylinders of the internal combustion engine in response to the depression of the accelerator pedal during the coast running of the vehicle until the engaging pressure of the lockup clutch decreases to the predetermined pressure.

4. The vehicle driving device according to claim 1, wherein the controller is further programmed not to suppress the fuel recovery when a depression amount of the accelerator pedal during the coast running exceeds a predetermined amount.

5. The vehicle driving device according to claim 1, wherein the internal combustion engine comprises an intake throttle and generates the output power according to a fuel supplied in response to an intake air amount that is regulated by the intake throttle, and the controller is further programmed to prohibit a throttle opening of the intake throttle from increasing as long as the fuel recovery is suppressed.

6. The vehicle driving device according to claim 1, wherein the controller is further programmed to operate the lockup clutch to disengage by outputting an engaging pressure decrease command signal and apply an advance correction to the engaging pressure decrease command signal in response to the depression of the accelerator pedal during the coast running of the vehicle.

7. The vehicle driving device according to claim 1, wherein the controller is further programmed to determine whether or not the engaging pressure of the lockup clutch has decreased to the predetermined pressure depending on an elapsed time from a start of disengaging operation of the lockup clutch.

8. The vehicle driving device according to claim 1, further comprising a sensor that detects the engaging pressure of the lockup clutch, wherein the controller is further programmed to determine that the engaging pressure of the lockup clutch has decreased to the predetermined pressure when the engaging pressure of the lockup clutch detected by the sensor has decreased to the predetermined pressure.

9. The vehicle driving device according to claim 1, further comprising a sensor that detects a slip rotation speed between the pump impeller and the turbine runner, wherein the controller is further programmed to determine that the engaging pressure of the lockup clutch has decreased to the predetermined pressure when the slip rotation speed has become equal to or greater than a predetermined speed.

10. The vehicle driving device according to claim 1, wherein the controller is further programmed to stop suppressing the fuel recovery when the depression amount of the accelerator pedal becomes equal to or greater than a predetermined amount even if the engaging pressure of the lockup clutch has not decreased to the predetermined pressure.

11. A vehicle driving device for a vehicle, comprising:
an internal combustion engine generating an output power by combustion of fuel supplied in response to a depression of an accelerator pedal of a vehicle while performing a fuel cut during a coast running of the vehicle in which the accelerator pedal is not depressed;
a torque converter that transmits the output power of the internal combustion engine to a drive wheel of the vehicle via a pump impeller and a turbine runner;

a lockup clutch that is engaged, when the vehicle performs the coast running, to directly connect the pump impeller with the turbine runner;

an accelerator pedal depression means that detects a depression of the accelerator pedal during the coast running;

a lockup clutch disengaging operating means for operating the lockup clutch to disengage in response to the depression of the accelerator pedal during the coast running of the vehicle; and a recovery suppressing means for suppressing a fuel recovery of the internal combustion engine in response to the depression of the accelerator pedal during the coast running of the vehicle until an engaging pressure of the lockup clutch decreases to a predetermined pressure.

12. A vehicle driving method for a vehicle, the vehicle comprising an internal combustion engine generating an output power by combustion of fuel supplied in response to a depression of an accelerator pedal of a vehicle while performing a fuel cut during a coast running of the vehicle in which the accelerator pedal is not depressed, a torque converter that transmits the output power of the internal combustion engine to a drive wheel of the vehicle via a pump impeller and a turbine runner, and a lockup clutch that is engaged, when the vehicle performs the coast running, to directly connect the pump impeller with the turbine runner, the method comprising:

detecting a depression of the accelerator pedal during the coast running;

operating the lockup clutch to disengage in response to the depression of the accelerator pedal during the coast running of the vehicle; and suppressing a fuel recovery of the internal combustion engine in response to the depression of the accelerator pedal during the coast running of the vehicle until an engaging pressure of the lockup clutch decreases to a predetermined pressure.

\* \* \* \* \*